(12) United States Patent
Skroski

(10) Patent No.: US 11,472,538 B1
(45) Date of Patent: Oct. 18, 2022

(54) LANDING GEAR ASSEMBLY FOR REDUCING DRAG ON AN AIRCRAFT

(71) Applicant: BETA AIR, LLC, South Burlington, VT (US)

(72) Inventor: Tyler Skroski, South Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/515,442

(22) Filed: Oct. 30, 2021

(51) Int. Cl.
| *B64C 25/12* | (2006.01) |
| *B64C 29/00* | (2006.01) |
| *B64C 25/52* | (2006.01) |
| *B64C 25/34* | (2006.01) |
| *B64C 25/58* | (2006.01) |

(52) U.S. Cl.
CPC .............. *B64C 25/12* (2013.01); *B64C 25/34* (2013.01); *B64C 25/52* (2013.01); *B64C 29/0025* (2013.01); *B64C 25/58* (2013.01); *B64C 2025/125* (2013.01)

(58) Field of Classification Search
CPC ............... B64C 25/12; B64C 29/0025; B64C 2021/125
See application file for complete search history.

(56) References Cited

U.S. PATENT DOCUMENTS

| 1,523,675 | A | * | 1/1925 | Towle | ..................... B64C 25/10 |
| | | | | | 244/102 R |
| 1,662,915 | A | * | 3/1928 | Burnelli | ................... B64C 25/12 |
| | | | | | 244/102 R |
| 1,721,935 | A | * | 7/1929 | Thurston | .................. B64C 25/12 |
| | | | | | 244/102 R |
| 1,774,032 | A | * | 8/1930 | Mooney | .................... B64C 25/12 |
| | | | | | 244/102 R |
| 2,044,338 | A | * | 6/1936 | Steward | .................. B64C 25/12 |
| | | | | | 244/102 R |
| 2,069,994 | A | | 2/1937 | Butler | |
| 2,323,367 | A | * | 7/1943 | Bertran | .................... B64C 25/12 |
| | | | | | 244/102 R |
| 4,027,836 | A | | 6/1977 | Seibel | |
| 5,478,030 | A | | 12/1995 | Derrien et al. | |
| 8,038,096 | B2 | | 10/2011 | White | |
| 9,027,878 | B2 | | 5/2015 | Simonneaux | |

(Continued)

FOREIGN PATENT DOCUMENTS

| WO | 2013133839 A1 | 9/2013 |
| WO | 2020234314 A1 | 11/2020 |

OTHER PUBLICATIONS

Eric Tegler, Active Landing Gear That Launch an Airplane Like a Bird Caught the Air Force's Attention., Apr. 2, 2021.

*Primary Examiner* — Tye William Abell
(74) *Attorney, Agent, or Firm* — Caldwell Intellectual Property Law, LLC

(57) ABSTRACT

The present disclosure provides a landing gear assembly for reducing drag on an aircraft. Landing gear assembly may include a proximal joint, a movable leg extending from the proximal joint, and a base attached to a distal end of the leg. The base may be configured to support the electric aircraft on an environmental surface. The landing gear assembly may transition between a deployed landing position and a collapsed flight position when landing and taking off to provide optimal aerodynamics of the aircraft.

19 Claims, 5 Drawing Sheets

(56) References Cited

U.S. PATENT DOCUMENTS

| | | | |
|---|---|---|---|
| 9,346,538 B2 | 5/2016 | Simonneaux et al. | |
| 9,868,534 B2 * | 1/2018 | Hara | B64C 25/36 |
| 10,569,865 B2 | 2/2020 | Birchette et al. | |
| 2003/0164424 A1 * | 9/2003 | Smith | B64C 25/54 |
| | | | 244/105 |
| 2013/0341459 A1 * | 12/2013 | Kosheleff | B64C 30/00 |
| | | | 244/199.4 |
| 2019/0300160 A1 * | 10/2019 | Moxon | B64C 25/12 |
| 2020/0156770 A1 | 5/2020 | Mombrinie | |
| 2020/0180761 A1 * | 6/2020 | Sloan | B64D 31/06 |
| 2020/0346743 A1 * | 11/2020 | Bernard | B64C 25/62 |
| 2020/0354042 A1 | 11/2020 | Schmidt et al. | |
| 2021/0188424 A1 * | 6/2021 | Karapetian | B64C 25/18 |

* cited by examiner

US 11,472,538 B1

LANDING GEAR ASSEMBLY FOR REDUCING DRAG ON AN AIRCRAFT

FIELD OF THE INVENTION

The present invention generally relates to the field of aircrafts. In particular, the present invention is directed to a landing gear assembly for reducing drag on an aircraft.

BACKGROUND

Landing gear is an essential part of an aircraft. However, cumbersome landing gear can generate unnecessary drag, such as form drag, that results in delayed movements of an aircraft through the air.

SUMMARY OF THE DISCLOSURE

In an aspect, a landing gear assembly for reducing drag on an aircraft is provided, where the landing gear assembly includes a proximal joint connected to an underbody of a fuselage of an electric aircraft; a movable leg extending from the proximal joint, wherein the leg is rotatably coupled to the proximal joint such that the leg rotates about proximal joint when transitioning between a deployed landing position and a collapsed flight position; and a base attached to a distal end of the leg, wherein the base is configured to support the electric aircraft on an environmental surface.

In another aspect, a method for reducing drag on an aircraft is provided, where the method includes providing a landing gear assembly, wherein the landing gear comprises: a proximal joint connected to an underbody of a fuselage of an electric aircraft; a movable leg extending from the proximal joint, wherein the leg is rotatably coupled to the proximal joint such that the leg rotates about proximal joint; a base attached to a distal end of the leg, wherein the base is configured to support the electric aircraft on an environmental surface; and transitioning, by the landing gear, from a deployed landing position to a collapsed flight position by rotating the leg about the proximal joint.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1A:
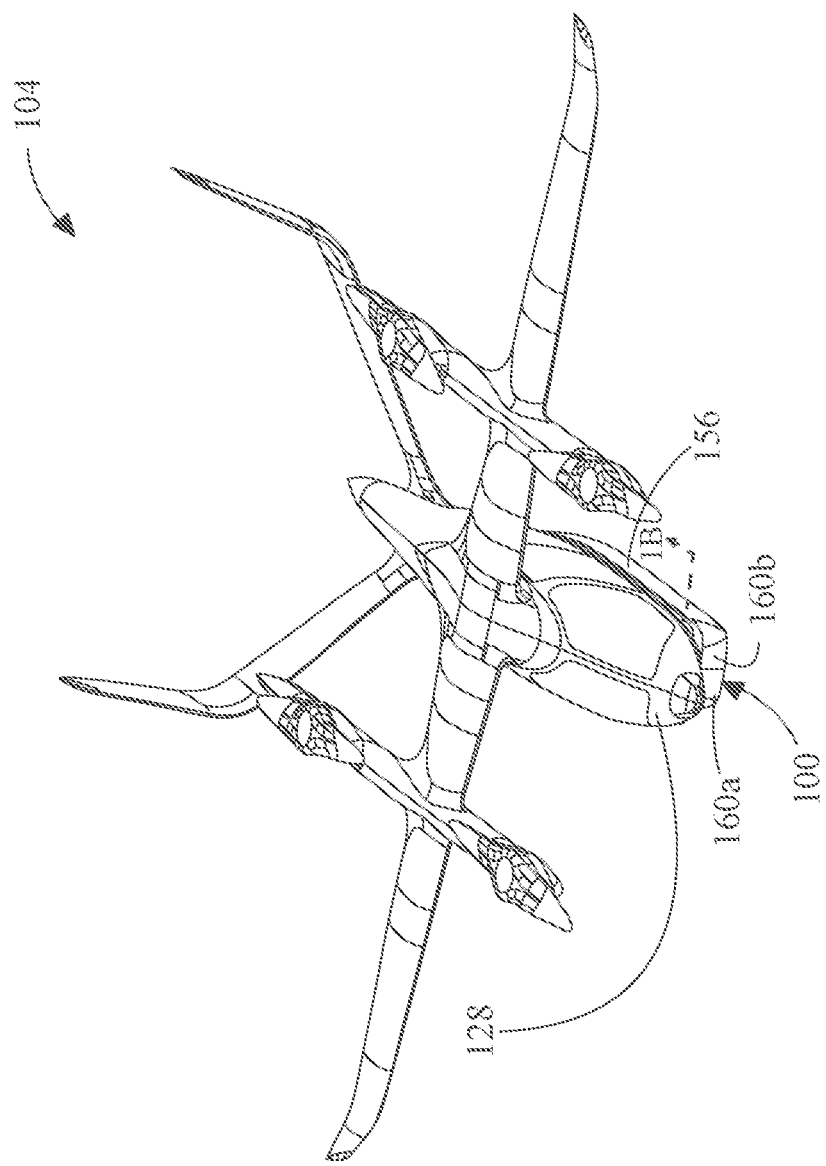
FIG. 1A is a diagrammatic representation illustrating an isometric view of the exemplary embodiment of a landing gear assembly in accordance with aspects of the invention.

At a high level, aspects of the present disclosure are directed to systems and methods for a landing gear assembly for reducing drag of an aircraft. In some embodiments, drag experienced by an aircraft may be reduced by providing a streamlined landing gear assembly. Streamlining an aircraft may be achieved by having retractable landing gear and/or by using a fairing that includes an aerodynamic skin that reduces turbulent flow about the aircraft. A landing gear assembly may include a proximal joint, a movable leg extending from the proximal joint, and a base attached to a distal end of the leg, wherein the base is configured to support the electric aircraft on an environmental surface. A leg may be rotatably coupled to a proximal joint such that the leg rotates about the proximal joint when transitioning between a deployed landing position and a collapsed flight position. When leg is in a collapse flight position, fairing may close about proximal joint, leg, and base, providing a smooth, aerodynamic surface that creates a laminar flow and reduces turbulent flow and wake that would be otherwise experienced by an aircraft if landing gear assembly was exposed during flight.

Additionally, and without limitation, aspects of the present disclosure are directed to a landing gear assembly that enhances safety during a crash landing. Aspects of the present disclosure can be used to reduce an impact experienced by a fuselage of an aircraft and/or components disposed therein during a crash landing. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1B:
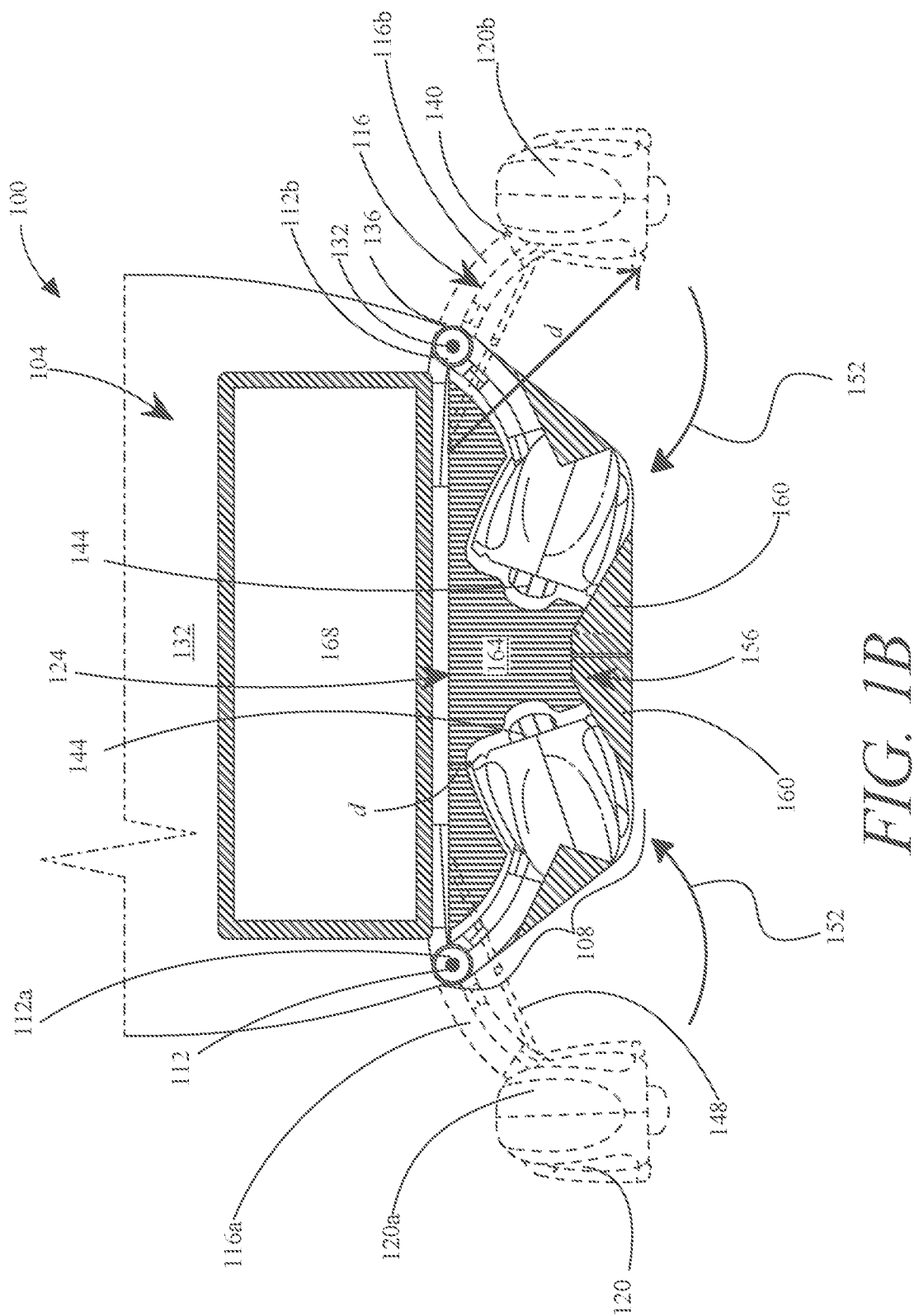
FIG. 1B is a diagrammatic representation illustrating a cross-sectional view of an exemplary embodiment of the landing gear assembly taken along line 1B-1B of FIG. 1A in accordance with aspects of the invention.

Referring now to the drawings, FIGS. 1A-1B illustrate an exemplary embodiment of a landing gear assembly 100 (also referred to herein as "landing gear") for reducing drag on an aircraft in accordance with one or more embodiments of the present disclosure. As shown in FIG. 1A, landing gear assembly 100 is configured to attached to an aircraft, such as an electric aircraft 104. Landing gear assembly may function as a component of an undercarriage of an aircraft that supports the weight of the aircraft when it is not in the air. Landing gear assembly 100 may be composed of any material suitable for composition of an aircraft as described above, including without limitation wood, fabric, aluminum, steel, titanium, polymers, carbon fiber, graphite-epoxy, epoxy fiber glass, fiber glass, metal alloys, epoxy resin, resin, composites, and the like. Landing gear assembly 100 may be designed with a consideration of energy absorption during a landing or crash landing, as discussed further in this disclosure.

Referring to FIG. 1B, in one or more embodiments, landing gear assembly 100 includes a proximal joint 112 connected to an underbody 124 of a fuselage 128 of an electric aircraft 104. Attachment of proximal joint 112 to fuselage 128 of aircraft 104 may be accomplished, without limitation, by bolting, riveting, welding, press fitting, and the like thereof. Proximal joint 112 may include a mechanical joint configured to facilitate rotation of landing gear assembly 100 by a predetermined amount about a central axis of the mechanical joint, such as a central axis 132 of proximal joint 112, as discussed further below. For instance, and without limitation, proximal joint 112 may include a ball bearing, pin joint, knuckle joint, ball joint, prismatic joint, universal joint, any combination thereof, and the like. For example, and without limitation, proximal joint 112 may include a hinge. In one or more embodiments, and without limitation, proximal joint 112 may include a plurality of proximal joints or, for example, an elongated proximal joint that extends along a length of fuselage 128. In one or more embodiments, and without limitation, proximal joint 112 may include a plurality of proximal joints. For example, and without limitation, proximal joint 112 may include at least a first proximal joint 112a and second proximal joint 112b. In another exemplary embodiment, and without limitation, proximal joint 112 may include opposing front proximal joints and opposing rear proximal joints, depending on how many attachment points are desired. In one or more embodiments, proximal joint 112 may be located at a mounting point on aircraft 104. In an exemplary embodiment, and without limitation, proximal joint 112 may be inset into fuselage 128 for load distribution.

Still referring to FIG. 1B, landing gear assembly 100 includes a movable leg 116 extending from proximal joint 112. Leg 116 is rotatably coupled to proximal joint 112 such that leg 116 rotates about proximal joint 112 when transitioning between a deployed landing position and a collapsed flight position. In one or more embodiments, and without limitation, proximal joint 112 may be attached to leg 116 at a proximal end 136 of leg 116. In one or more embodiments, and without limitation, leg 116 may include a plurality of legs, where each leg 116 is attached to a corresponding proximal joint 112. For example, and without limitation, landing gear assembly 100 may include at least a first leg 116a mechanically connected to first proximal joint 112a and a second leg 116b mechanically connected to a second proximal joint 112b. In one or more exemplary embodiments, and without limitation, first leg 116a and second leg 116b may be opposing legs where each leg 116 is positioned on an opposite side of underbody 124.

In one or more non-limiting embodiments, leg 116 may include a straight post. In other non-limiting embodiments, leg 116 may include a curved post, as shown in FIG. 1B. In other non-limiting embodiments, leg 116 may include a straight or curved surface, such as, for example, an elongated panel that extends along a length of fuselage 132 of aircraft 104. In one or more embodiments, leg 116 may include a monolithic structure. In other embodiments, leg 116 may include a plurality of components that are mechanically connected. In one or more embodiments, proximal end 136 of leg 116 may include a complementary surface or component configured to engage and mechanically connect leg 116 and proximal joint 112. In one or more embodiments, distal end 140 of leg 116 may include a complementary surface or component configured to mechanically connect leg 116 and base 120. In one or more embodiments, distal end 140 of leg 116 may be detachably joined to base 120. In other embodiments, distal end 140 of leg 166 may be fixedly connected to base 120. For example, and without limitation, leg 116 and base 120 may include a monolithic structure, such as with a skid. In one or more embodiments, leg 116 may include materials such as aluminum, titanium, steel, fiber carbon, fiberglass, epoxy, composites, or any other material used to withstand heavy loads and a high-impact contact.

Still referring to FIG. 1B, landing gear assembly 100 includes a base 120 attached to a distal end 140 of leg 116, where base 120 is configured to support electric aircraft 104 on an environmental surface, such as a runway. Base 120 may be mechanically connected to leg 116, such as with a wheel, or may create a monolithic structure with leg 116, such as a monolithic skid. In one or more embodiments, base 120 may include a plurality of bases 120. For example, and without limitation, base 120a may be attached to leg 116a and base 120b may be attached to leg 116b. In other exemplary embodiments, and without limitation, a base may be attached to one or more legs, such as a skid bar extending the length of a fuselage of an aircraft and being attached to a front and a rear leg of landing gear assembly 100.

Still referring to FIG. 1B, in one or more embodiments, base 120 may include a wheel, skid, ski, any combination thereof, or the like. One of ordinary skill in the art, upon reading the entirety of this disclosure would appreciate the variety of bases that may be present in an electric aircraft consistent with the present disclosure. Base may be consistent with disclosure of landing components in U.S. patent application Ser. No. 17/196,719 and titled "A System for Rolling Landing Gear", which is incorporated herein by reference in its entirety. For example, and without limitation, base 120 may include wheel 144, which is configured to enable a rolling takeoff, rolling landing, and/or taxing of aircraft 104. As used in this disclosure a "rolling takeoff" is an action of becoming airborne as a function of rolling on the ground for some time with acceleration. As a non-limiting example, a rolling takeoff may include a takeoff in which the aircraft does not stop on the runway when it enters the taxi track, but continues the takeoff by opening the throttle either during the turn or immediately after rolling out. As used in this disclosure a "rolling landing" is a movement of an aircraft from touchdown through deceleration to taxi speed and/or full stop. As a non-limiting example, a rolling landing may include an aircraft that is returning to the ground may approach the ground with a certain forward moving force, wherein the aircraft may touchdown and continue moving in the direction of the forward moving force, while rolling to decelerate. As used in this disclosure a "wheel" is a circular, disc-shaped, and/or annular object that revolves on an axle and/or fulcrum, which may be at a geometric center of the wheel, and is fixed below the aircraft and/or other object to enable it to move easily over the ground. As a non-limiting example, a wheel may include an aircraft wheel. Wheel includes an aircraft tire. As used in this disclosure an "aircraft tire" is an annular component attached to and/or surrounding a rim and/or hub of a wheel such that the tire contacts a surface on which the wheel rests instead of the rim. A tire may be composed at least in part of an elastomeric material such as rubber. An aircraft tire may include an interior lumen or sealed chamber, which may also be annular, and which may be filled with pressurized gas to increase the tire's resistance to elastic deformation, permitting it to bear greater weight without allowing the rim to contact the ground. Aircraft tire may be capable of being exposed to temperatures below −40° C. and/or above 200° C. without losing elasticity or integrity. Aircraft tires may be composed of, without limitation rubber, nylon, cord, and/or steel. Aircraft tires may include a tire tread pattern. As used in this disclosure a "tire tread pattern" is a circumferential groove molded into the rubber of the tire to improve traction. For example, and without limitation, a tire tread pattern may be composed of 4 circumferential grooves molded into the aircraft tire to channel water away from the tire surface. In an embodiment and without limitation, tire tread patterns may be designed to maximize the amount of rubber making contact with the ground to decrease the landing distance and/or enhance braking performance.

Still referring to FIG. 1B, aircraft tires may be mounted to aircraft wheel hubs and/or rims. As used in this disclosure an "aircraft wheel hub" is the rim of the wheel that is configured to have an inboard wheel rim and an outboard wheel rim. Aircraft wheel rim may bolt together the inboard wheel rim and outboard wheel rim to secure aircraft tires to the aircraft wheel rim. An 0-ring may be placed between the inboard and outboard wheel rim to mate the surface and create a sealed connection. In an embodiment, and without limitation, an aircraft wheel rim may be composed of aluminum, magnesium alloys, polymer composites, and the like thereof. Wheels and/or tires may be configured to include a medium for inflation. Medium may consist of any compound and/or substance that may achieve a particular inflation for wheel. Medium may include substances and/or compounds that aid in reducing the chance of fire and/or explosion. In an embodiment and without limitation a medium may include nitrogen, wherein the nitrogen is trapped between the inboard wheel rim, aircraft tire, and outboard wheel rim. Nitrogen may contain no water vapor reducing the amount of moisture, wherein reducing the amount of moisture may mitigate variations of pressures at temperature extremes. Nitrogen may reduce the amount of oxygen in the tires, wherein reducing the amount of oxygen may reduce the oxidizing power to promote explosions and/or fires. Nitrogen may also reduce corrosion to aluminum and/or steel inboard wheel rim and/or outboard wheel rim. Nitrogen may also reduce reduction of tire pressure as nitrogen may be larger molecules that permeate at slower rates than other mediums. As used in this disclosure "tire pressure" is the amount of force and/or pressure that exists within an aircraft tire when sealed. Tire pressure may include tire pressures consisting of 100 psi-300 psi.

In an embodiment, and still referring to FIG. 1B, tire safety device may include a brake temperature monitoring system. As used in this disclosure, a "brake temperature monitoring system" system that senses the temperature of the braking mechanism. Brake temperature monitoring system may include one or more sensors that are capable of detecting a braking mechanism temperature. For example, and without limitation, a brake temperature monitoring system may include negative temperature coefficient thermistors, resistance temperature detectors, thermocouple, semiconductor-based sensors, and the like thereof. Additionally or alternatively, tire safety device may include one or more tire chines. As used in this disclosure a "tire chine" is an edge and/or sidewall of an aircraft tire that displaces standing water. For example, and without limitation a tire chine may be constructed that deflects standing water outward to reduce water ingestion into an engine and/or propulsor of the aircraft.

Still referring to FIG. 1B, wheel 144 may be journaled on a rotational fulcrum. As used in this disclosure a "rotational fulcrum" is a hinge and/or pivot point that allows a wheel to rotate 360°. Rotational fulcrum may include one or more bearings. As used in this disclosure a "bearing" is a hinge and/or pivot point that constrains relative motion to the desired motion and reduces friction between moving parts. Bearings may provide free linear movement of the moving part and/or free rotation around a fixed axis. Bearings may facilitate the desired motion by minimizing friction. Bearings may hold and/or secure rotating components such as shafts and/or axles within rotational fulcrum that transfers axial and/or radial loads from the source of the load to the structure supporting it. Bearings may include a plain bearing. As used in this disclosure a "plain bearing" is a shaft rotating in a hole. Plain bearings may include, without limitation, a bushing, journal bearing, sleeve bearing, rifle bearing, and/or composite bearing. Bearings may include a rolling element bearing. Bearing may include a flexure bearing. As used in this disclosure a "flexure bearing" is a bearing in which the motion is support by a load element that bends. As a non-limiting example, a flexure bearing may include a bearing capable of angular compliance.

In one or more embodiments, base 120 of landing gear 100 may include a skid tube that may have a recess that houses a wheel allowing the wheel to rotate freely contacting the skid tube. For example, and without limitation recess may include an elliptical shape, wherein the ellipsis is elongated along the longitudinal axis of the skid tube. As a further non-limiting example, recess may include an oval and/or pyriform shape that extends along the longitudinal axis of the skid tube. In an embodiment recess may include one or more covered cavities that house a wheel. For example, and without limitation a wheel may be house inside of recess, wherein the wheel is secured to the rotational fulcrum as a function of the axis such that the wheel is able to freely rotate and/or retract and/or extend as a function of the biasing means, wherein a biasing means is described in detail below. For example, and without limitation the wheel may be enclosed from any objects and/or mediums from interacting with the wheel other than from the bottom opening of the recess. In an embodiment, and without limitation, recess may include a through hole. For example, and without limitation a through hole may include an elliptical shape, oval shape, pyriform shape, and the like thereof, that is uncovered on both the top and the bottom of the recess such that the wheel is able to freely rotate without contact from the skid tube. For example, and without limitation, a wheel may be secured in a through hole, such that the top and bottom of the wheel may be exposed to the surrounding ground and/or mediums, wherein the wheel is able to rotate freely and/or retract and/or extend as a function of the biasing means, wherein a biasing means is described in detail below.

In other embodiments, base 120 of landing gear assembly 100 may include a skid, where a skid may consist of two or more beams, rods, and/or braces that run parallel to one another with a distance separating the two beams, rods, and/or braces. A skid tube may be composed of one or more materials comprised of aluminum alloys, titanium alloys, steel alloys, polymers, polymer composites, tungsten carbides, any combination thereof, and the like thereof.

As a further non-limiting example, a skid component may include one or more skis. Base 120 and/or leg 116 may include materials such as aluminum alloys, titanium alloys, steel alloys, polymer composites, tungsten carbides, carbon fiber, fiberglass, any combination thereof, and the like thereof. For example, and without limitation, base 120 may include a carbon fiber skid.

Still referring to FIG. 1B, in one or more embodiments, landing gear assembly 100 may include a landing component 108. As used in this disclosure, a "landing component" is a part of landing gear assembly that supports the weight of an aircraft when it is in contact with an environmental surface and facilitates movement of the grounded aircraft if necessary. In one or more embodiments, landing component 108 may include proximal joint 112, leg 116, and base 120. In an exemplary embodiment, and without limitation, landing gear assembly 100 may include a plurality of landing components 108. As understood by one skilled in the art, landing component 108 may include any number of proximal joints, legs, and bases while still within the scope of the present invention.

In an embodiment, and still referring to FIG. 1B, landing gear assembly 100 may include a biasing means (not shown), or a suspension system attached to landing component 108, such as attached to leg 116. As used in this disclosure a "biasing means" is a mechanism that generates an elastic recoil force when moved or deformed. Additionally or alternatively, biasing means may include one or more shock absorber characteristics. As used in this disclosure a "shock absorber characteristic" is a damper and/or hydraulic device that absorbs shock impulses. In an embodiment a shock absorber characteristic may include a characteristic of a material that converts kinetic energy of the shock into another form of energy, such as heat. In another embodiment a shock absorber characteristic may include a characteristic that converts a first form of kinetic energy, the shock, into a second form of kinetic energy, such as forcing the wheel into the recess.

Still referring to FIG. 1B, a biasing means may be comprised of a mechanical component such as a spring. As used in this disclosure a "spring" is an elastic object that stores and/or exerts mechanical energy. For instance, and without limitation, spring may be a coil spring or a leaf spring. As used in this disclosure a "leaf spring" is a flat spring used in the suspension of objects, vehicles, and the like thereof. A leaf spring may include one or more semi-elliptical springs, elliptical springs, three quarter-elliptic, quarter elliptic, and/or transverse. In an embodiment, a leaf spring takes the form of a slender arc-shaped length of spring steel of rectangular cross-section, wherein the center of the arc provides location of the acle, while loops formed at either end provide for attached to the aircraft. A leaf spring may be layered with several leaves tacked on top of each other to aid in damping as well as springing functions. In one or more embodiments, and without limitation, a leaf spring may include a carbon prestressed leaf spring. In another embodiment, and without limitation, a leaf spring may include a fiberglass prestressed leaf spring.

Still referring to FIG. 1B, landing gear assembly 100 may further include a locking mechanism 148 configured to stabilize leg 116 in a deployed landing position. For the purposes of this disclosure, a "locking mechanism" is a moveable component and/or part that provides temporary support for stabilizing a leg of a landing component when the landing component is supporting the weight of an aircraft by securing the leg into an extended position away from the underbody of the aircraft. In one or more embodiments, locking mechanism 148 may be configured to secure leg 116 in a deployed landing position. In one or more embodiments, and without limitation, locking mechanism 148 may include an outrigger bar. For example, and without limitation, an outrigger bar may be attached to leg 116 at a first end and attached to underbody 124 of aircraft 104 at a second end.

Still referring to FIG. 1B, landing gear assembly 100 is configured to transition between a deployed landing portion and a collapsed flight position. A deployed landing position is a position where flight component 108 is extended away from underbody 142 of aircraft 104 so that flight component 108 may support a weight of aircraft 104 (as indicated by broken-line flight components 108 in FIG. 1B). For example, and without limitation, a deployed landing position may be used in preparation for a landing or to allow taxing of aircraft 104. A collapsed flight position is a position where flight component 108 is retracted toward underbody 124 of aircraft 104 so flight component 108 does not interfere with maneuverability of aircraft 104 during flight (as indicated by the solid-line flight components 108 in FIG. 1B). For example, and without limitation, a collapsed flight position may be used after takeoff of aircraft 104 and during flight.

In one or more embodiments, and without limitation, and continuing to refer to FIG. 1B, landing gear assembly 100 may transition from a deployed landing position to a collapsed flight position, which includes pivoting leg 116 toward underbody 124 of fuselage 128 until base 120 is adjacent to underbody 124. For example, and without limitation, distal end 140 of leg 116 and base 120 may traverse in an arcuate path about proximal joint 112, as indicated by arrow 152. In one or more embodiments, and without limitation, a distance d between base 120 and underbody 124 of fuselage 128 may decrease when landing gear assembly 100 is in a collapsed flight position. In one or more exemplary embodiments, landing gear assembly 100 may include opposing landing components 108, as previously mentioned in this disclosure. Upon actuation of landing gear assembly 100 into in a collapsed flight position, distal ends 140 of first leg 116*a* and second leg 116*b* may be displaced such that distal ends 140 may pivot toward each other about first proximal joint 112*a* and second proximal joint 112*b*.

Still referring to FIG. 1B, in one or more embodiments, and without limitation, landing gear assembly 100 may transition between collapsed flight position and deployed landing position. For instance, and without limitation, landing gear assembly 100 may transition from collapsed flight position to deployed landing position by pivoting leg 116 away from underbody 124 of fuselage 128 so that leg 116 extends from underbody 124 of fuselage 128. For example, and without limitation, distal end 140 of leg 116 and base 120 may traverse in an arcuate path about proximal joint 112 in a direction opposite of the direction indicated by arrow 152. In one or more embodiments, and without limitation, a distance d between base 120 and underbody 124 of fuselage 128 may increase when landing gear assembly 100 is in collapsed flight position. In deployed landing position, base 120 may contact an environmental surface when aircraft 104 is grounded. In one or more exemplary embodiments, landing gear assembly 100 may include opposing landing components 108, as previously mentioned in this disclosure. Upon actuation of landing gear assembly 100 into in deployed landing position, distal ends 140 of first leg 116*a* and second leg 116b may be displaced such that distal ends 140 may pivot away from each other about first proximal joint 112a and second proximal joint 112b. In one or more embodiments, an actuator may be configured to transition landing gear assembly 100 between the collapsed flight position and the deployed landing position. An actuator may be manually controlled, for example, by a flight controller of aircraft 104, as discussed further below. In one or more embodiments, an actuator may include pneumatic pistons, hydraulic pistons, and/or solenoid pistons. In other embodiments, an actuator may use electrical components. For example, and without limitation, an actuator may include a hydraulic piston that extends or retracts to actuate landing gear assembly 100. In another example, and without limitation, actuator may include a solenoid. In one or more embodiments, actuator may be triggered by electrical power, pneumatic pressure, hydraulic pressure, or the like. Actuator may also include electrical motors, servomotors, cables, and the like, as discussed further below. As understood by one skilled in the art, landing gear assembly may include a plurality of actuators. For example, and without limitation, landing gear assembly 100 may include an actuator configured to move each landing component 108. In one or more embodiments, actuator may receive an attitude command from a pilot control or flight controller and subsequently actuate to transition landing component 108 to a desired position, such as collapsed flight position or deployed landing position.

With continued reference to FIGS. 1A and 1B, landing gear assembly 100 may include an underbody fairing 156 (also referred to herein as a "fairing") configured to substantially cover landing gear assembly 100 when in the collapsed flight position. For the purposes of this disclosure, an "underbody fairing" may include an external structure on the underside of an aircraft that reduces form drag and interference drag of the aircraft by at least partially covering a flight component of landing gear assembly during flight. In one or more embodiments, fairing 156 may be a shell or a shroud that covers at least a portion of underbody 124 of aircraft 104. In one or more non-limiting embodiments, fairing 156 may include a rigid frame covered in a protective, streamlined skin. For example, and without limitation, fairing 156 may include an epoxy fiber glass construction. In one or more embodiments, fairing 156 may be one or more belly fairings, or ventral fairings, where fairing 156 may be located between the wings of aircraft 104 on the underside, such as underbody 124 of fuselage 128 of aircraft 104 and act as a shroud. In one or more embodiments, underbody fairing 156 is configured to reduce drag during a flight of electric aircraft 104. Fairing 156 reduces drag by streamlining an exterior of aircraft 104. Streamlining aircraft 104 using fairing 156 reduces turbulent flow and wake that would otherwise be experienced by aircraft 104 if landing gear assembly 100 was exposed during flight by providing a smooth, aerodynamic surface that creates a laminar flow. Thus, covering landing gear assembly 100 with fairing 156 minimizes air disturbance which results in more efficient maneuvering of aircraft 104 during flight. In one or more non-limiting embodiments, fairing 156 may be moveable so that fairing 156 may move about flight component 108 between an open and closed position. For example, and without limitation, when closed, or enclosing landing component 108, fairing 156 may define a cavity that landing component 108 may be disposed therein while in a collapsed flight position. As understood by one skilled in the art, fairing 156 may be various sizes and shapes while still providing an aerodynamic surface for aircraft 104. For example, and without limitation, fairing 156 may have a semi-dome cross section. In other exemplary embodiments, fairing 156 may extend along the entire length of underbody 124 or only a portion of the length of underbody 124.

In one or more non-limiting embodiments, fairing 156 may include a two-part mating structure. For the purpose of this disclosure, a "two-part mating structure" is a structure and/or component that includes a pair of opposing hinged or sliding doors and/or panels that move relative to landing component of landing gear assembly so as to enclose or expose the landing component. For example, and without limitations, fairing 156 may include two opposing skin panels, such as a first skin panel 160a and a second skin panel 160b, that may each be connected to fuselage 128 via, for example, pivoting joints (not shown). In one or more embodiments, in addition to covering landing gear assembly 100, fairing 156 may also be used to cover additional cargo storage, fuel tanks, or power source storage compartments. Furthermore, if aircraft 104 experiences a crash landing, fairing 156 may be configured to provide impact absorption protection to protect such components of aircraft 104, as discussed further below.

In one or more embodiments, fairing 156 may be designed to absorb energy and/or preclude extensive damage to aircraft 104 in the event of a landing or a crash. Fairing 156 may include materials such as aluminum, titanium, steel, fiber carbon, fiberglass, epoxy, composites, or any other material used to withstand a high-impact contact.

In one or more embodiments, fairing 156 may include an impact absorption material 164. Impact absorption material 164 may be used to pad and secure landing gear assembly 100 in fairing 156. For example, and without limitation, in one or more embodiments, impact absorption material 164 may be a padding lining the inside of fairing 156. Impact absorption material 164 may include one or more complementary surfaces that may abut landing gear assembly 100. For example, and without limitation, impact absorption material may include a surface that is a complementary shape to that of legs 116 and base 120 so that legs 116 and base 120 are substantially supported by fairing 156 when landing gear assembly 100 is in the collapse flight position. In one or more embodiments, impact absorption material 164 may be configured to protect landing gear assembly 100 when substantially covered by fairing 156. For example, and without limitations, impact absorption material 164 may be configured to dampen impact between fuselage 128 of aircraft 104 and an environmental surface during a collision. More specifically, if landing gear assembly fails to deploy, fairing 156 may provide protection for fuselage 128 and other aircraft components, such as a power source 168 of aircraft 104.

In some embodiments, impact absorption material 164 may be configured to provide load distribution on impact of the deployed flight position landing gear. In one or more embodiments, impact absorption material 164 may include various types of shock absorbing materials that dampen forces experienced by fairing 156. For example, and without limitation, impact absorption material may include Sorbothane®, foam, polymers, polyurethane, silicone, and the like.

Figure 2:
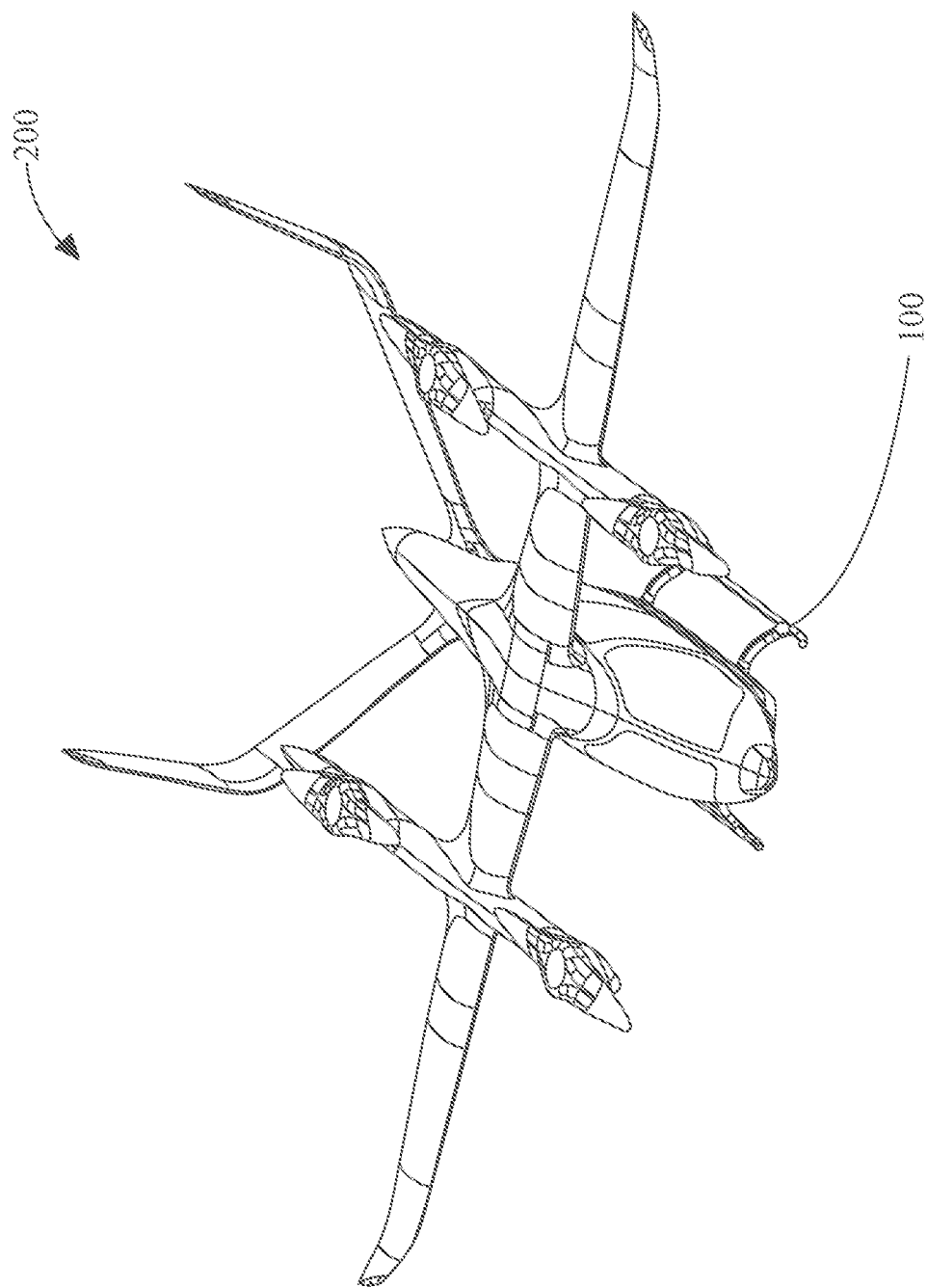
FIG. 2 is a diagrammatic representation illustrating an isometric view of another exemplary embodiment of landing gear assembly in accordance with aspects of the invention.

Now referring to FIG. 2, an exemplary embodiment aircraft 200 with an exemplary landing gear assembly 100 is shown in accordance with one or more embodiments of the present disclosure. An "aircraft", as described herein, is a vehicle that travels through the air. As a non-limiting example, aircraft may include airplanes, helicopters, airships, blimps, gliders, paramotors, drones, and the like. Additionally or alternatively, an aircraft may include one or more electric aircrafts and/or hybrid electric aircrafts. For example, and without limitation, aircraft 200 may include an electric vertical takeoff and landing (eVTOL) aircraft, as shown in FIG. 2. As used herein, a vertical take-off and landing (eVTOL) aircraft is an electrically powered aircraft that can take off and land vertically. An eVTOL aircraft may be capable of hovering. In order, without limitation, to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight is where the aircraft generates lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight.

Figure 3:
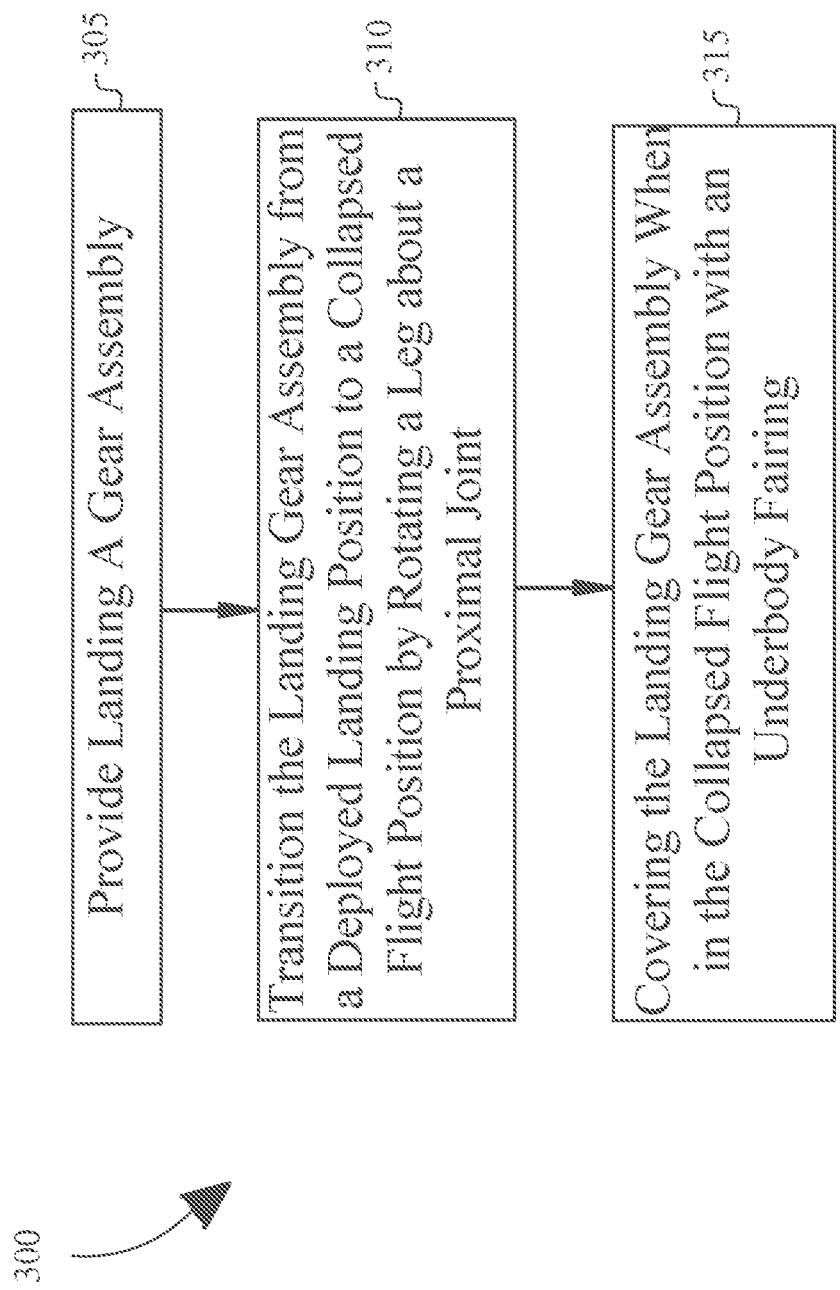
FIG. 3 is a flow diagram illustrating an exemplary method of using landing gear assembly in accordance with aspects of the invention.

Now referring to FIG. 3, a flowchart illustrating a method 300 for reducing drag on aircraft 104 is shown in accordance with one or more embodiments of the present disclosure.

A shown in block 305, method 300 includes providing landing gear assembly 100, which may be mechanically connected to underbody 124 of fuselage 128 of aircraft 104. As previously mentioned, landing gear assembly 100 may include proximal joint 112 connected to underbody 124 of fuselage 128 of electric aircraft 104; movable leg 116 extending from proximal joint 112, where leg 116 is rotatably coupled to proximal joint 112 such that leg 116 rotates about proximal joint 112; and base 120 attached to distal end 140 of leg 116, where base 120 is configured to support electric aircraft 104 on an environmental surface.

As shown in block 310, method 300 includes transitioning, by landing gear assembly 100, from a deployed landing position to a collapsed flight position by rotating leg 116 about proximal joint 112. As shown in block 315, method 300 may also include covering landing gear assembly 100 when in the collapsed flight position with underbody fairing 156. As previously mentioned in this disclosure, fairing 156 may include a two-part mating structure that closes about landing gear 100 to protect landing gear 100 and reduce drag on aircraft 104 during flight. In one or more embodiments, transitioning landing gear 100 from a deployed landing position to a collapsed flight position, transitioning landing gear from a collapsed flight position to a deployed landing position, or closing and opening fairing 156 about landing gear 100 may be controlled by a computing device. For instance, and without limitation, movements of landing assembly 100 may be controlled by a flight controller, as described further below. For instance, and without limitation, a flight controller may receive a command via an input from, for example, a user to retract landing gear 100 and close fairing 156 after takeoff; the flight controller may then transmit a signal to one or more actuators of landing gear assembly 100 to execute the inputted command. In one or more embodiments, flight controller may automatically transition landing gear 100 between a deployed landing position and collapsed flight position and/or open and close fairing 156 based on, for example, a detected status of aircraft 104. In other embodiments, flight controller may transition landing gear 100 between a deployed landing position and collapsed flight position and/or open and close fairing 156 based on a user command. For example, and without limitation, a pilot may input a command into flight controller to open fairing 156 and transition landing gear 100 to a deployed landing position in preparation for a landing of aircraft 104.

Figure 4:
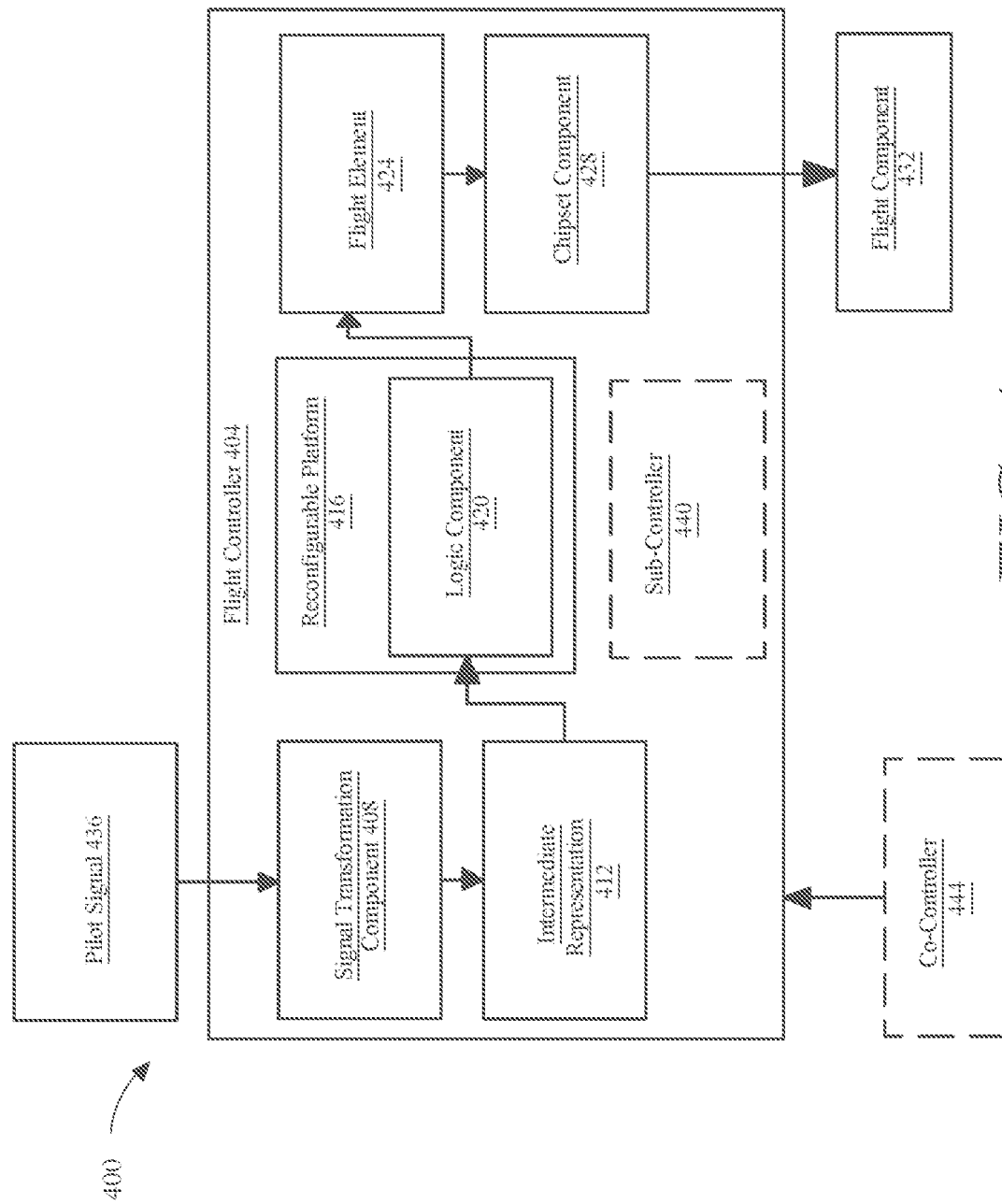
FIG. 4 is a block diagram of a flight controller in accordance with aspects of the invention.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 4, a machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by machine-learning module may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier. Training data classifier may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module may generate a classifier using a classification algorithm, defined as a processes whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier may classify elements of training data to sub-categories of flight elements such as torques, forces, thrusts, directions, and the like thereof.

Still referring to FIG. 4, machine-learning module may be configured to perform a lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process. At least a supervised machine-learning process, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of at least a supervised machine-learning process that may be used to determine relation between inputs and outputs. Supervised machine-learning processes may include classification algorithms as defined above.

Further referring to FIG. 4, machine learning processes may include at least an unsupervised machine-learning processes. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A landing gear assembly for reducing drag on an aircraft, wherein the landing gear assembly comprises:
    a proximal joint connected to an underbody of a fuselage of an electric aircraft;
    a movable leg extending from the proximal joint, wherein the leg is rotatably coupled to the proximal joint such that the leg rotates about proximal joint when transitioning between a deployed landing position and a collapsed flight position;
    a base attached to a distal end of the leg, wherein the base is configured to support the electric aircraft on an environmental surface;
    a fairing comprising only a first skin panel and a second skin panel positioned on opposite sides of the fuselage, the fairing comprising a two-part mating structure; and
    a flight controller, wherein the flight controller is configured to move, using least an actuator, the first skin panel and the second skin panel to enclose the base within a cavity of the fairing.

2. The system of claim 1, wherein the fairing comprises an impact absorption material configured to provide load distribution on impact of the deployed flight position landing gear.

3. The system of claim 1, wherein transitioning between the deployed landing position and the collapsed flight position comprises pivoting the leg toward the underbody of the fuselage until the base is adjacent to the underbody.

4. The system of claim 1, wherein transitioning between the collapsed flight position the and the deployed landing position comprises pivoting the leg away from the underbody of the fuselage so that the leg extends from the underbody of the fuselage.

5. The system of claim 1, wherein the proximal joint comprises a hinge.

6. The system of claim 1, wherein the proximal joint comprises a mechanical joint configured to facilitate rotation of landing gear by a predetermined amount about a central axis of the mechanical joint.

7. The system of claim 1, further comprising a locking mechanism configured to stabilize the leg in the deployed landing position.

8. The system of claim 1, where the base comprises a carbon fiber skid.

9. The system of claim 1, wherein the base comprises a wheel.

10. The system of claim 1, wherein the aircraft comprises an electric vertical takeoff and landing (eVTOL) aircraft.

11. The system of claim 1, wherein the cavity of the fairing is configured to substantially cover the landing gear when in the collapsed flight position.

12. The system of claim 11, wherein the cavity of the fairing is configured to reduce drag during a flight of the electric aircraft.

13. The system of claim 1, wherein the fairing comprises an impact absorption material configured to protect the landing gear when substantially covered by the fairing.

14. The system of claim 13, wherein the impact absorption material is configured to dampen impact between the fuselage and the environmental surface during a collision.

15. A method for reducing drag on an aircraft, wherein the method comprises:
providing a landing gear assembly, wherein the landing gear comprises:
a proximal joint connected to an underbody of a fuselage of an electric aircraft;
a movable leg extending from the proximal joint, wherein the leg is rotatably coupled to the proximal joint such that the leg rotates about proximal joint;
a base attached to a distal end of the leg, wherein the base is configured to support the electric aircraft on an environmental surface; and
transitioning, by the landing gear, from a deployed landing position to a collapsed flight position by rotating the leg about the proximal joint; wherein transitioning further comprises:
commanding, through a flight controller of the aircraft, at least an actuator of the electric aircraft to move a first skin panel of a fairing and a second skin panel of the fairing positioned opposite the first skin panel of the fairing, wherein the first skin panel of the fairing and the second skin panel of the fairing are configured to enclose the base in a cavity of the fairing.

16. The method of claim 15, further comprising covering the landing gear when in the collapsed flight position within the cavity of the fairing.

17. The method of claim 15, wherein the fairing comprises a two-part mating structure.

18. The method of claim 15, wherein the proximal joint comprises a mechanical joint configured to facilitate rotation of landing gear by a predetermined amount about a central axis of the mechanical joint.

19. The method of claim 15, wherein the aircraft comprises an electric vertical takeoff and landing (eVTOL) aircraft.

* * * * *